United States Patent
Kirklin

(10) Patent No.: US 8,101,308 B2
(45) Date of Patent: Jan. 24, 2012

(54) ADAPTIVE COMPRESSOR SURGE CONTROL IN A FUEL CELL SYSTEM

(75) Inventor: Matthew C Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 882 days.

(21) Appl. No.: 12/145,597

(22) Filed: Jun. 25, 2008

(65) Prior Publication Data
US 2009/0325010 A1  Dec. 31, 2009

(51) Int. Cl.
*H01M 8/04* (2006.01)
(52) U.S. Cl. .......................... 429/428; 429/429; 429/446
(58) Field of Classification Search .......... 429/428–433, 429/443, 444, 446
See application file for complete search history.

(56) References Cited

U.S. PATENT DOCUMENTS

| | | |
|---|---|---|
| 2004/0161647 A1 | 8/2004 | Rainville et al. |
| 2005/0047943 A1 | 3/2005 | Jarrah |
| 2005/0164057 A1 | 7/2005 | Pospichal et al. |
| 2008/0226956 A1* | 9/2008 | Rainville et al. ............... 429/22 |

* cited by examiner

*Primary Examiner* — Thanhha Pham
(74) *Attorney, Agent, or Firm* — Fraser Clemens Martin & Miller LLC; J. Douglas Miller

(57) ABSTRACT

A fuel cell system having an adaptable compressor map and method for optimizing the adaptable compressor map is provided. The method includes the steps of establishing an initial operating setpoint for an air compressor based on the adaptable compressor map; monitoring a surge indicator; adjusting the adaptable compressor map based on the monitored surge indicator; determining a desired operating setpoint based on the adjusted adaptable compressor map; and establishing an adapted operating setpoint for the air compressor based on the adaptable compressor map following the adjustment thereof. The steps are repeated until the adaptable compressor map for the air compressor is optimized.

14 Claims, 4 Drawing Sheets

ADAPTIVE COMPRESSOR SURGE CONTROL IN A FUEL CELL SYSTEM

FIELD OF THE INVENTION

The present disclosure relates to a fuel cell system, and more particularly to a method for controlling air compressor surge events in the fuel cell system.

BACKGROUND OF THE INVENTION

Fuel cells have been proposed as a clean, efficient and environmentally responsible power source for electric vehicles and various other applications. A plurality of fuel cells can be stacked together in series to form a fuel cell stack capable of supplying a desired amount of electricity. The fuel cell stack has been identified as a potential alternative to the traditional internal-combustion engine used in automobiles.

One type of fuel cell is known as a proton exchange membrane (PEM) fuel cell. The PEM fuel cell is an electrochemical device that includes an anode and a cathode with an electrolyte membrane therebetween. The anode receives hydrogen gas and the cathode receives oxygen. The hydrogen gas is catalytically disassociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

The fuel cell stack typically receives oxygen for the cathodes from charged air provided by an air compressor. It is known in the art to employ in a fuel cell system a turbo-machine type compressor that has a rapidly rotating rotor that increases the velocity and pressure of fluid moving therethrough. Typical turbo-machine type compressors include centrifugal, radial, axial, mixed flow, and the like. Turbo-machine type compressors are low in cost and weight, and operate with minimal noise. Another category of compressor known for use in fuel cell systems is the "positive displacement" compressor. The positive displacement compressor has at least one rotor in close proximity to another rotor or to a stator. The positive displacement compressor is well known in the art and includes rotary machines such as scroll machines, vane machines and screw machines, roots blowers, and the like.

The typical air compressor operates according to a compressor map of pressure ratio (outlet pressure/inlet pressure) versus mass flow. FIG. 1 is an exemplary compressor map 10 for a turbo-machine type compressor, showing mass flow on the horizontal axis and pressure ratio on the vertical axis. The compressor map 10 includes a series of speed lines 12 that show the relationship between mass flow through the air compressor and the pressure ratio across the air compressor at various compressor speeds. Most air compressors are generally provided with compressor maps 10 and operate according thereto.

The compressor map 10 is bound by a surge line 14 and a choke line 15. When operating under conditions exceeding the surge line 14, the air compressor suffers from a flow reversion caused by excessive back-pressure. The surge line 14 is determined by a number of factors, including the speed or RPM of the compressor, the system back-pressure, altitude and temperature. Excessive back-pressure from the fuel cell system, in particular, may cause a compressor surge event. The surge event may result in an undesirable oscillation of the airflow through the air compressor.

One known system and method that employs surge prevention by electronically mapping the compressor for discharge pressure versus mass airflow is disclosed in U.S. Pat. Application No. 2005/0164057 to Pospichal et al., hereby incorporated herein by reference in its entirety. Another known system and method for surge avoidance that employs a control valve for opening and closing a recirculation valve in response to detection of an incipient surge condition is described in U.S. Patent Application No. 2004/0161647 to Rainville et al., hereby incorporated herein by reference in its entirety.

A surge control distance (SCD) 16 is a known control parameter used to avoid the surge event when operating the air compressor in the fuel cell system. The SCD 16 is a desired difference between a current operating condition of the air compressor and a minimum stable operating condition dictated by the surge line 14. The SCD 16 for a standard air compressor is generally statistically based on a relevant sample of like air compressors. The SCD 16 accounts for part-to-part variation in the air compressor, variation in fuel cell system sensors, and changes to the air compressor tolerance due to wear with use. It is desirable to minimize the SCD 16, however, in order to maximize the efficiency of the air compressor and minimize the use of bypass airflow typically employed to correct surge events.

There is a continuing need for a system and method of maximizing the efficiency of the air compressor in the fuel cell system, minimizing the quantity of compressor bypass air, and avoiding surge events.

SUMMARY OF THE INVENTION

In concordance with the instant disclosure, a system and method of maximizing the efficiency of the air compressor in the fuel cell system, minimizing the quantity of compressor bypass air, and avoiding surge events, is surprisingly discovered.

In one embodiment, a fuel cell system includes a fuel cell stack having an anode inlet and a cathode inlet. An air compressor is in fluid communication with the cathode inlet. At least one sensor is adapted to measure a surge indicator of the fuel cell system. The fuel cell system further includes a controller in electrical communication with the at least one sensor and configured to adjust an adaptable compressor map in response to the measured surge indicator. The controller also is configured to establish an operating setpoint of the air compressor based on the measured surge indicator.

In another embodiment, a method for operating a fuel cell system includes the steps of: a) providing the fuel cell system; b) providing the adaptable compressor map having a surge line and a surge control distance (SCD); c) establishing an initial operating setpoint for the air compressor based on the adaptable compressor map; d) monitoring a surge indicator; e) adjusting the adaptable compressor map based on the surge indicator; f) determining a desired operating setpoint based on the adjusted adaptable compressor map; g) establishing an adapted operating setpoint for the air compressor based on the adaptable compressor map following the adjustment thereof; and h) repeating the steps d)-g). The adaptable compressor map for the air compressor is thereby optimized.

In a further embodiment, a method for operating a fuel cell system includes the steps of: a) providing the fuel cell system; b) providing the adaptable compressor map for having a surge line and a surge control distance (SCD); c) establishing an initial operating setpoint for the air compressor based on the adaptable compressor map, the initial operating setpoint providing a stable operation of the air compressor according to the adaptable compressor map; d) monitoring for an incipient surge by measuring at least one of the pressure fluctuation and the mass flow fluctuation; e) adjusting the adaptable compressor map by one of: i) increasing the SCD or decreasing the surge line, if the incipient surge is detected, ii) decreasing the SCD or increasing the surge line, if the incipient surge is not detected and a desired threshold has not been reached, and iii) maintaining the SCD or maintaining the surge line, if the desired threshold has been reached, and repeating steps d)-e) until the incipient surge is detected; f) determining a desired operating setpoint based on the adjusted adaptable compressor map; g) establishing an adapted operating setpoint for the air compressor based on the adaptable compressor map following the adjustment thereof; and h) repeating the steps d)-g). The adaptable compressor map for the air compressor is thereby optimized.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
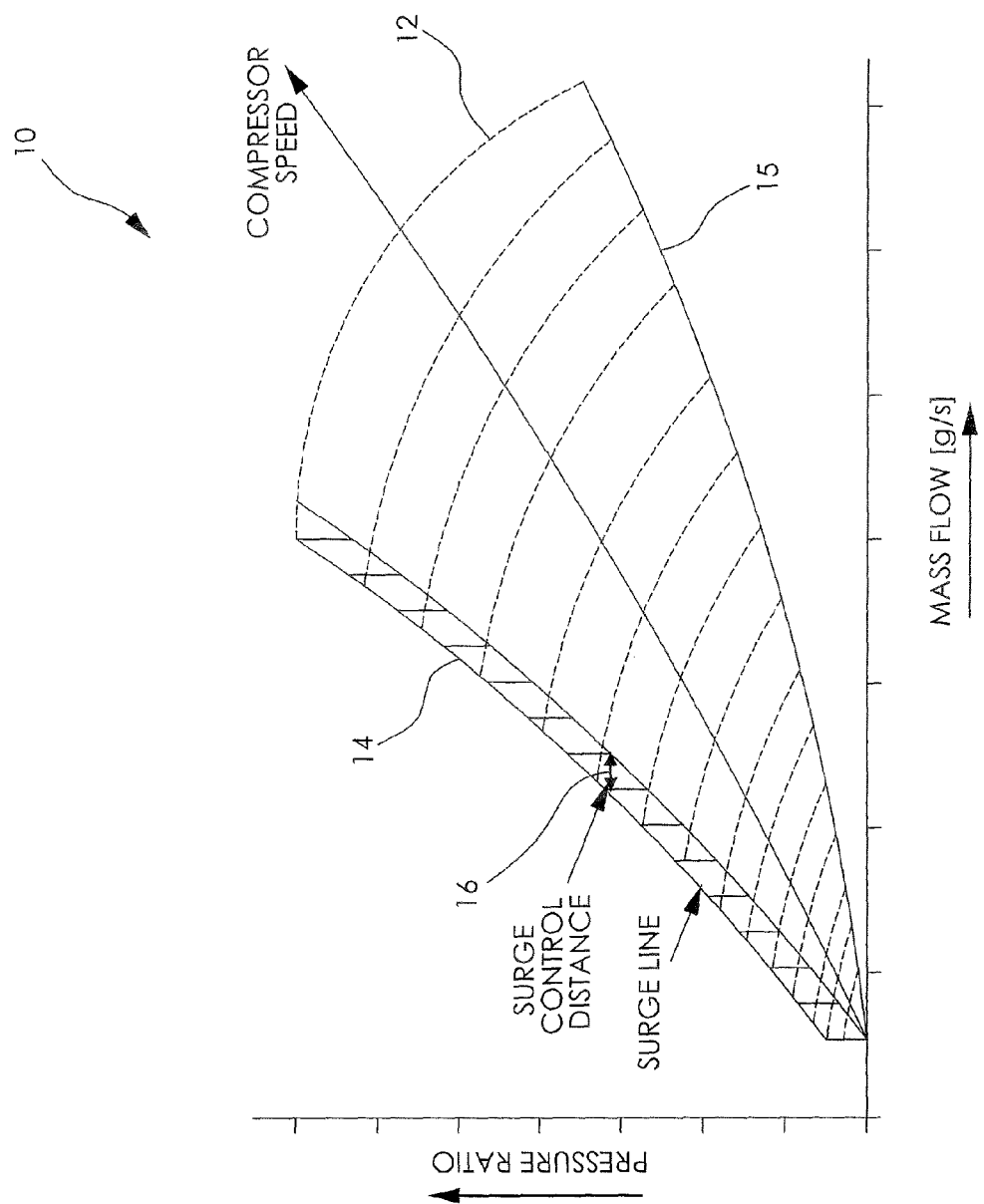
FIG. 1 is a graph showing a typical compressor map plotting mass airflow versus pressure ratio.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 2:
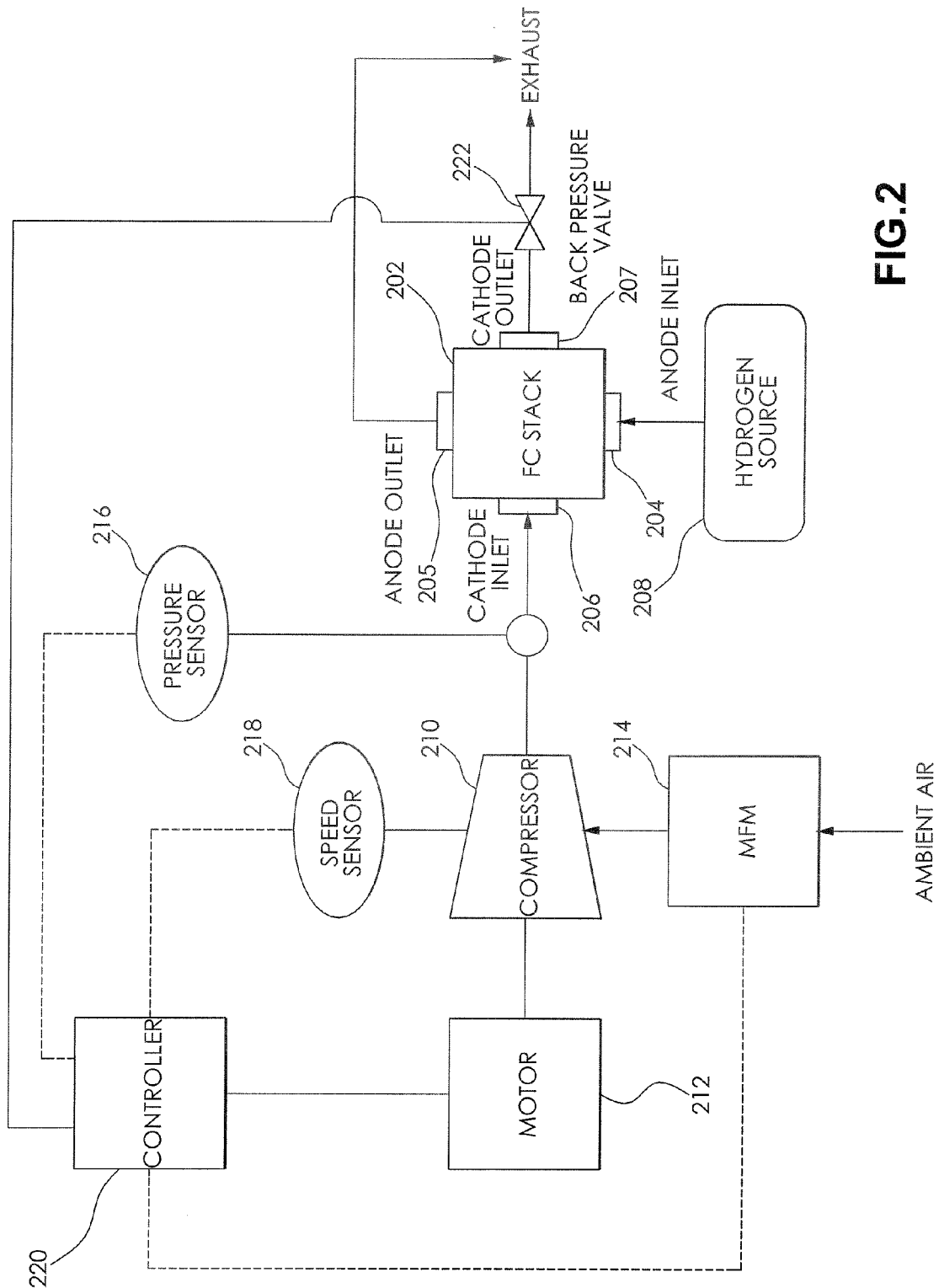
FIG. 2 is a schematic diagram of a fuel cell system for adaptive surge control according to an embodiment of the present disclosure.

FIG. 2 depicts an exemplary fuel cell system 200 according to the present disclosure. The fuel cell system 200 includes a fuel cell stack 202 having a plurality of fuel cells as is well understood in the art. The fuel cell stack 202 has an anode inlet 204, and anode outlet 205, a cathode inlet 206, and a cathode outlet 207. The anode inlet 204 is in fluid communication with a hydrogen source 208. The cathode inlet 206 is in fluid communication with an air compressor 210. The fuel cell system 200 can be used for any suitable application, such as on a vehicle or a distributed generation power system, for example.

The air compressor 210 is adapted to provide charge air to the cathode inlet 206 of the fuel cell stack 202. The air is drawn from the atmosphere, typically through a filter (not shown), to the air compressor 210. The air compressor 210 may be in communication with a motor 212. The motor 212 drives the air compressor 210 at a desired speed to provide a quantity of charge air to the fuel cell stack 202, for example, to attain a particular output power. The air compressor 210 may be any suitable turbo-machine type compressor with a compressor map, such as a centrifugal compressor, radial compressor, axial compressor, mixed flow compressor, and the like. A skilled artisan should appreciate that other air compressors 210 having compressor maps are also suitable.

The fuel cell system 200 includes a plurality of sensors 214, 216, 218 adapted to measure at least one surge indicator for an incipient surge condition that is known to precede a surge event in the air compressor 210. The incipient surge condition is detected by monitoring at least one of the mass flow rate and outlet pressure for a characteristic fluctuation or oscillation. As nonlimiting examples, the sensors 214, 216, 218 may include a mass flow meter (MFM) 214, a pressure transducer 216, and a speed sensor 218. The MFM 214 is in fluid communication with the inlet of the air compressor 210. The MFM 214 is adapted to measure a rate of air flow or mass flow through the air compressor 210. For example, the MFM 214 may generate a voltage signal indicative of the speed of the mass flow through the MFM 214. The pressure transducer 216 is in communication with the air compressor 210. The pressure transducer 216 is adapted to measure the outlet pressure at the air compressor 210, and thereby facilitate a determination of the pressure ratio. The speed sensor 218 is in communication with the air compressor 210 and adapted to measure a speed of the air compressor 210. In another embodiment, the fluctuation in the mass flow rate or outlet pressure is measured acoustically. Other sensors that may be employed to directly or indirectly detect fluctuation in the mass flow rate and outlet pressure may also be employed.

The fuel cell system 200 includes a controller 220. The controller 220 is in electrical communication with at least one of the sensors 214, 216, 218 and adapted to receive signals indicative of surge indicator measurements therefrom. The controller 220 controls the speed of air compressor 210, for example, by controlling the motor 212. The controller 220 may further control a back pressure valve 222 that is in fluid communication with the cathode outlet 207 of the fuel cell stack 202. The back pressure valve 222 is adapted to control the internal pressure of the fuel cell stack 202, as is well understood in the art. The controller 220 controls the operating setpoints of the air compressor 210, such as a particular mass flow rate and pressure ratio, as desired. It should be appreciated that a variety of factors may be employed to determine the operating setpoints, including desired output power, ambient temperature, altitude, and the like.

In one embodiment, the controller 220 controls a by-pass valve (not shown) disposed between the air compressor 210 and the cathode inlet 206 of the fuel cell stack 202. The by-pass valve may circulate airflow around the fuel cell stack 202 as desired. The by-pass valve may be adapted to reduce the fuel cell stack 202 pressure when opened and eliminate surge events in the air compressor 210.

The fuel cell system 200 has an adaptable compressor map 10. The controller 220 is able to derive the map location at which the air compressor 210 is operating in real-time. The controller 220 adjusts the operating setpoints and maintains the air compressor 210 within stable "on map" conditions. As used herein, the term "adaptable" means that the adaptable compressor map 10 may be modified or otherwise adjusted during an operation of the air compressor 210, as opposed to merely being used to adjust the operating setpoints of the air compressor 210. In a particular embodiment, the controller 220 adjusts the adaptable compressor map 10 in response to at least one of the surge indicators measured by the at least one sensor 214, 216, 218. The controller 220 is configured to selectively increase or decrease at least one of the surge line 14 and the SCD 16, for example. The controller 220 may include a memory within which the adaptable compressor map 10 is electronically stored following the adjustment thereof. The adaptable compressor map 10 may be continuously or intermittently adjusted to account for part-to-part variation and lifetime wear of the air compressor 210, thereby optimizing the efficiency of the air compressor 210 and militating against surge events.

Figure 3:
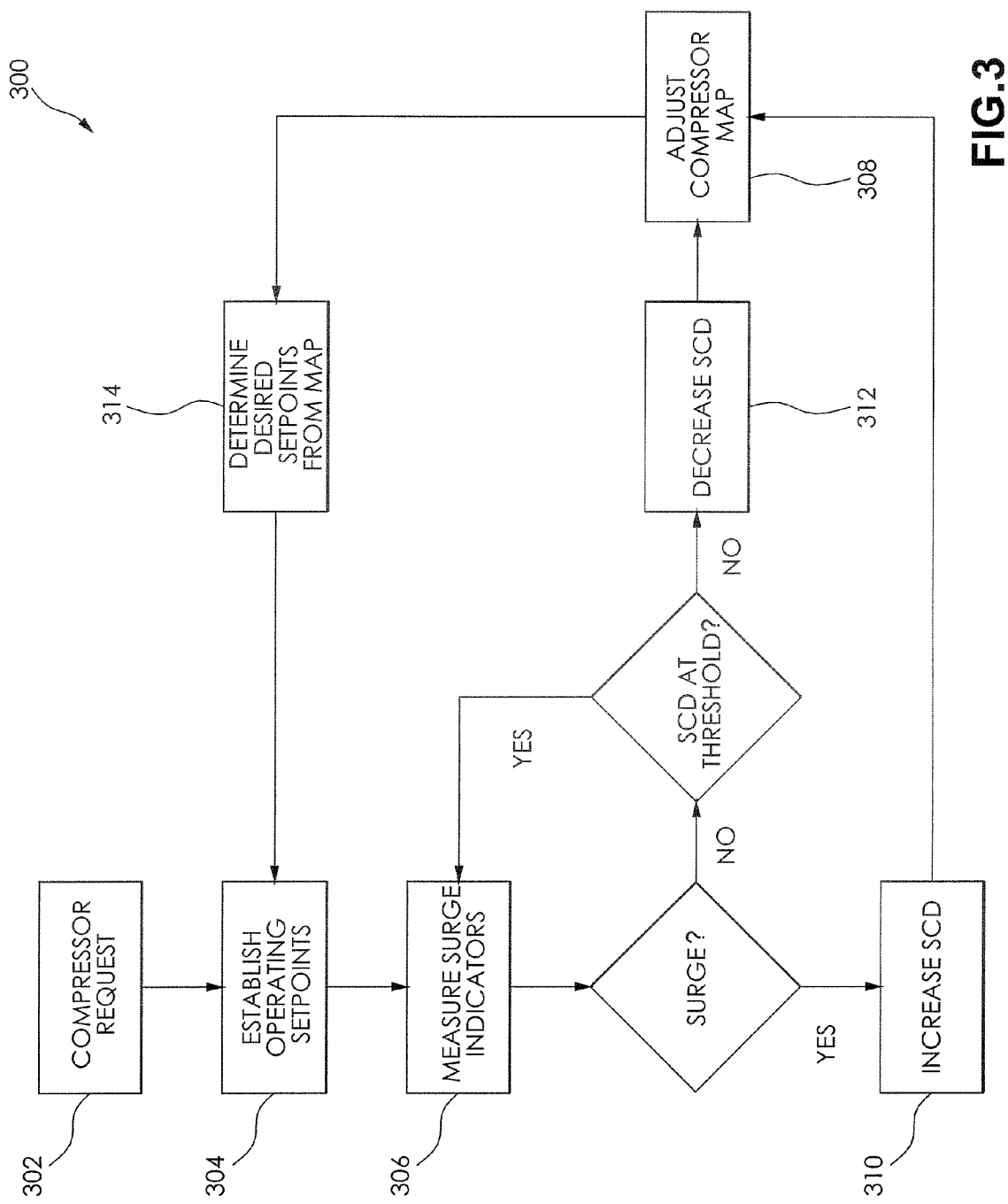
FIG. 3 is a schematic flow diagram showing a method for adaptive surge control with adjustment of a surge control distance of a compressor map.

As shown in FIG. 3, the present disclosure includes a method 300 for operating the fuel cell system 200. The fuel cell system 200 is operated according to the method 300 to optimize the adaptable compressor map 10 for the air compressor 210. The method 300 includes the steps of providing the fuel cell system 200 as described hereinabove with the adaptable compressor map 10 having the surge line 14 and the SCD 16. A compressor request 302 is initially performed during a startup operation of the fuel cell system 200, and typically begins the method 300.

The compressor request 302 is followed by an establishment 304 of initial operating setpoints for the air compressor 210. The initial operating setpoints are established based on the adaptable compressor map 10. As a nonlimiting example, an initial speed of the air compressor 210 may be set during the establishment 304 of the initial operating setpoints. Other suitable operating parameters may also be set during the establishment 304 of the operating setpoints.

The method 300 includes a step of monitoring 306 the at least one surge indicator, such as one of the mass flow rate and the pressure ratio indicated by the sensors 214, 216, 218. The sensors 214, 216, 218 may measure a fluctuation or oscillation of at least one of the pressure ratio and the mass flow rate, the fluctuation of which is indicative of an incipient surge as is known in the art. The monitoring 306 typically commences upon operation of the air compressor 210 with the initial operating setpoints and may be continuous or intermittent, as desired. The adaptable compressor map 210 is then modified or adjusted 308 in response to the at least one surge indicator measured during the monitoring 306 step.

The adjustment step 308 includes one of increasing 310 the SCD, decreasing 312 the SCD 16, and maintaining the SCD 16, as desired. In a particular embodiment, the SCD 16 is increased if the incipient surge is detected, the SCD 16 is decreased if the incipient surge is not detected and a desired threshold for the SCD 16 has not been reached, and the SCD 16 is maintained if the desired threshold has been reached. When the SCD 16 is maintained, the adaptable compressor map 10 is not further adjusted until the incipient surge is detected through the monitoring 306 of the surge indicators.

Following the adjustment 308 of the adaptable compressor map 10, the method 300 includes the step of determining 314 the desired operating setpoints. The desired operating setpoints are selected for the air compressor 210 to operate in a stable region of the adaptable compressor map 10. For example, the desired operating setpoints may be substantially at the adjusted SCD 16, for example. In another example, the desired operating setpoints may be between the adjusted SCD 16 and the choke line 15, also known as the "stable region" of the adaptable compressor map 10. One of ordinary skill in the art should appreciate that the desired operating setpoints providing stable operation may be selected as desired.

The desired operating setpoints selected for the air compressors 210 are employed to reestablish 304 the operating setpoints of the air compressor 210. The method 300 is then repeated as desired, for example, until a true surge line 14 and a suitable SCD 16 is determined or the adaptable compressor map 10 is deemed sufficiently adjusted. The efficiency of the air compressor 210 is thereby optimized and an occurrence of the surge event militated against.

The desired threshold for the SCD 16 is generally a value greater than the SCD 16 used in the step of establishing 304 the initial operating setpoint. For example, the desired threshold of the SCD 16 is up to about one percent (1%) greater, in particular embodiments up to about 0.5 percent greater, and in a most particular embodiment up to about 0.25 percent greater, than the SCD 16 used in the establishment step 304. One of ordinary skill in the art should understand that other suitable thresholds may be selected as desired.

As a nonlimiting example, the SCD 16 is increased by a first increment when the incipient surge is detected. The first increment may provide a buffer sufficient to militate against the incipient surge in an operation of the air compressor 210 immediately following the adjustment 308. Following the adjustment 308 of the adaptable compressor map 10 and the re-establishment 304 of the operating setpoints, the SCD 16 is decreased by a second increment if the incipient surge is not detected.

The second increment is typically selected to be less than the first increment so that the SCD 16 may be incrementally decreased and optimized following the detection of the incipient surge. The step of decreasing the SCD 16 may be performed one or more times until one of the incipient surge is detected and the desired threshold for the SCD 16 is reached. As a nonlimiting example, the SCD may be increased up to about ten percent (10%) following the detection of the incipient surge. After the operating setpoints are reestablished 304, the SCD 16 may be decreased by up to about three percent (3%) up to either three times to reach the desired threshold of about one percent (1%), or until the incipient surge occurs again and the SCD 16 is increased further. Other suitable increments for increasing the SCD 16 and decreasing the SCD 16 may be selected as desired.

It should be appreciated that when the fuel cell system 200 having the air compressor 210 is first operated, the establishment 304 of the initial operating setpoints may be based on the adaptable compressor map 10 having a statistical surge line 14 and a statistical SCD 16. The method 300 may include a further step of storing the adaptable compressor map 10 in the memory of the controller 220 following the adjustment 308 thereof. The adaptable compressor map 10 may be stored during a shutdown operation of the fuel cell system 200, for example. During a subsequent startup operation, the establishment 304 of the initial operating setpoints is based on the adaptable compressor map 10 having been adjusted during a prior operation of the fuel cell system 200.

Figure 4:
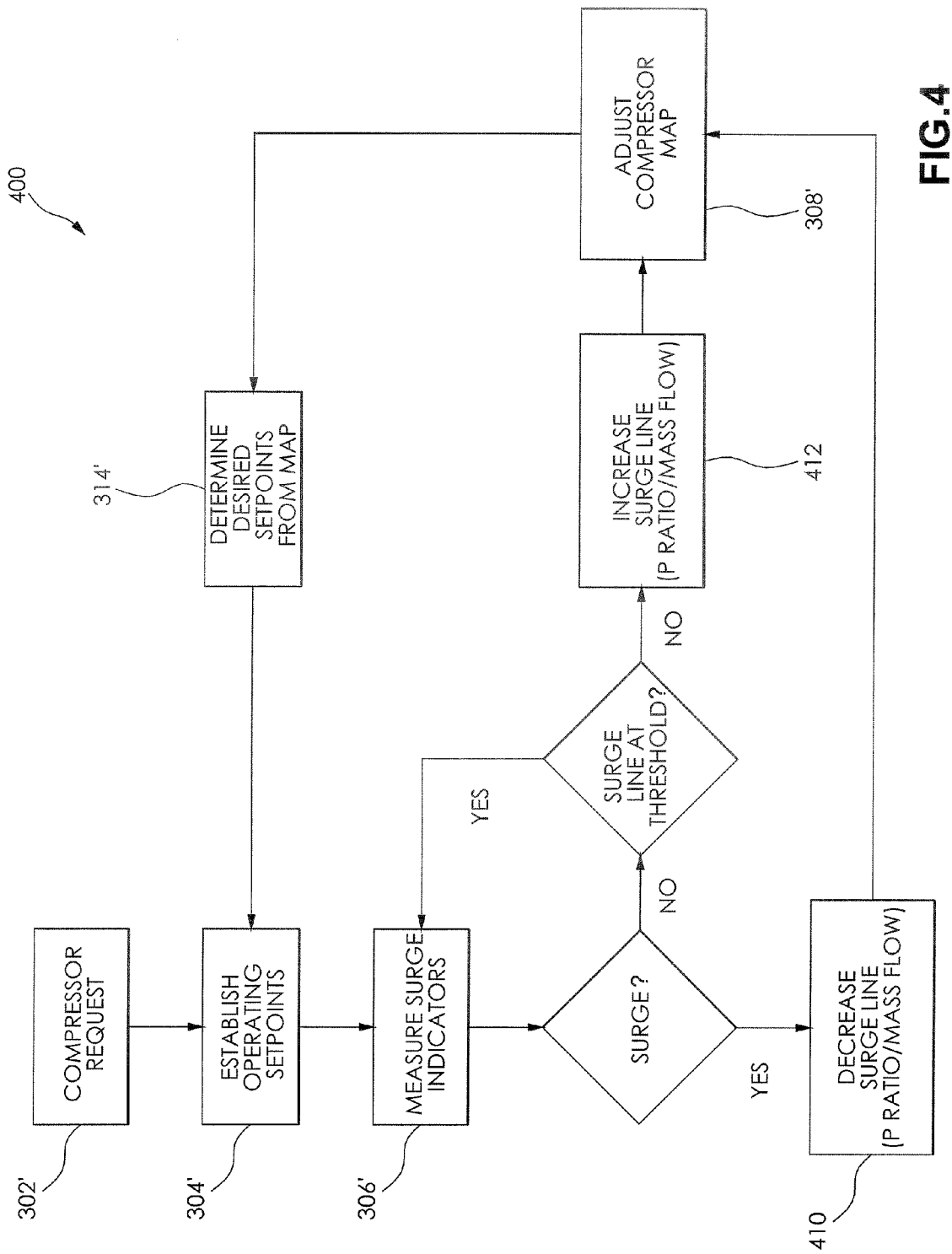
FIG. 4 is a schematic flow diagram showing a method for adaptive surge control with adjustment of a surge line of a compressor map.

Referring now to FIG. 4, the present disclosure further includes a second method 400 for operating the fuel cell system 200 to optimize the adaptable compressor map 10 for the air compressor 210. Like or related steps from FIG. 3 and shown in FIG. 4 are depicted with a prime (') symbol for purpose of clarity.

The second method 400 includes the steps of requesting 302' the compressor operation, establishing 304' the operating setpoints, monitoring 306' the surge indicators, adjusting 308' the adaptable compressor map 10, determining 314' the desired setpoints from the adaptable compressor map 10, and re-establishing 304' the operating setpoints based on the adjusted adaptable compressor map 10.

The step of adjusting 308' the adaptable compressor map 10 in the second method 400 includes adjusting the location of the surge line 14. For example the surge line 14 is one of decreased 410 if the incipient surge is detected, increased 412 if the incipient surge is not detected and the desired threshold for the surge line 14 has not been reached, and maintained if the desired threshold of the surge line 14 has been reached.

A skilled artisan should appreciate that the methods 300, 400 of the present disclosure maximize the efficiency of the fuel cell system 200 by allowing the adaptable compressor map 10 to be optimized for a particular air compressor 210 employed in the fuel cell system 200. A minimized use of compressor bypass air, employed in conventional systems to correct surge events, may be realized with the optimization of the air compressor 210 operating setpoints based on the adaptable compressor map 10. The method 300, 400 facilitates the learning of the true surge line 14 of the air compressor 210 by slowly decreasing the SCD 16 until either the incipient surge is detected or the desired threshold is met. The occurrence of the surge event during operation of the fuel cell system 200 is thereby militated against.

It is surprisingly found with the fuel cell system 200 and methods 300, 400 of the present disclosure that the adaptable compressor map 10 may be optimized in real-time without requiring off-line characterization. The methods 300, 400 are therefore able to account for age related effects, such as wear over the lifetime of the air compressor 210, that are known to affect the map location of the surge line 14.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for operating a fuel cell system, the method comprising the steps of:
   a) providing the fuel cell system including a fuel cell stack having an anode inlet and a cathode inlet, an air compressor in fluid communication with the cathode inlet, at least one sensor adapted to measure a surge indicator, and a controller in electrical communication with the at least one sensor;
   b) providing an adaptable compressor map for the air compressor, the compressor map having a surge line and a surge control distance (SCD);
   c) establishing an initial operating setpoint for the air compressor based on the adaptable compressor map;
   d) monitoring the surge indicator;
   e) adjusting the adaptable compressor map based on the monitored surge indicator;
   f) determining a desired operating setpoint based on the adjusted adaptable compressor map;
   g) establishing an adapted operating setpoint for the air compressor based on the adaptable compressor map following the adjustment thereof; and
   h) repeating the steps d)-g), thereby optimizing the adaptable compressor map for the air compressor.

2. The method of claim 1, wherein the adaptable compressor map used in the step of establishing the initial operating setpoint includes a statistical surge line and a statistical SCD for the air compressor.

3. The method of claim 1, wherein the step of monitoring the surge indicator includes measuring a fluctuation of at least one of a pressure ratio and a mass flow rate to detect an incipient surge.

4. The method of claim 1, further comprising the step of storing the adaptable compressor map in a memory upon a shutdown of the fuel cell system for a subsequent operation thereof.

5. The method of claim 1, wherein the step of adjusting the adaptable compressor includes one of:
   i) increasing the SCD if an incipient surge is detected;
   ii) decreasing the SCD if the incipient surge is not detected and a desired threshold for the SCD has not been reached; and
   iii) maintaining the SCD if the desired threshold for the SCD has been reached and repeating steps d)-e) until the incipient surge is detected.

6. The method of claim 5, wherein the SCD is increased by a first increment when an incipient surge is detected and the SCD is decreased by a second increment when the incipient surge is not detected, the first increment being greater than the second increment.

7. The method of claim 5, wherein the step of decreasing the SCD is performed one or more times until one of an incipient surge is detected and the desired threshold for the SCD is reached.

8. The method of claim 5, wherein the desired threshold for the SCD is a value greater than the SCD used in the step of establishing the initial operating setpoint if the initial operating setpoint resulted in an incipient surge.

9. The method of claim 8, wherein the desired threshold of the SCD is up to about one percent (1%) greater than the SCD used in the step of establishing the initial operating setpoint.

10. The method of claim 5, wherein the step of increasing the SCD includes increasing the SCD up to about ten percent (10%) thereof.

11. The method of claim 5, wherein the step of decreasing the SCD includes decreasing the SCD up to about 3 percent (3%) thereof.

12. The method of claim 1, wherein the step of determining the desired operating setpoint includes selecting at least one of an air compressor speed and a fuel cell stack back pressure providing stable operation of the air compressor according to the adaptable compressor map.

13. The method of claim 1, wherein the step of adjusting the adaptable compressor includes one of:
   i) decreasing the surge line if an incipient surge is detected;
   ii) increasing the surge line if the incipient surge is not detected and a desired threshold for the surge line has not been reached; and
   iii) maintaining the surge line if the desired threshold of the surge line has been reached and repeating steps d)-e) until the incipient surge is detected.

14. A method for operating a fuel cell system, the method comprising the steps of:
   a) providing the fuel cell system including a fuel cell stack having an anode inlet and a cathode inlet, an air compressor in fluid communication with the cathode inlet, a pressure transducer adapted to measure a pressure fluctuation, a mass flow meter adapted to measure a mass flow fluctuation, and a controller in electrical communication of the pressure transducer and the mass flow meter;
   b) providing an adaptable compressor map for the air compressor, the compressor map having a surge line and a surge control distance (SCD);
   c) establishing an initial operating setpoint for the air compressor based on the adaptable compressor map, the initial operating setpoint providing a stable operation of the air compressor according to the adaptable compressor map;
   d) monitoring for an incipient surge by measuring at least one of the pressure fluctuation and the mass flow fluctuation;
   e) adjusting the adaptable compressor map by one of:
      i) increasing the SCD or decreasing the surge line, if the incipient surge is detected, ii) decreasing the SCD or increasing the surge line, if the incipient surge is not detected and a desired threshold has not been reached, and
iii) maintaining the SCD or maintaining the surge line, if the desired threshold has been reached, and repeating steps d)-e) until the incipient surge is detected;
f) determining a desired operating setpoint based on the adjusted adaptable compressor map;
g) establishing an adapted operating setpoint for the air compressor based on the adaptable compressor map following the adjustment thereof; and
h) repeating the steps d)-g), thereby optimizing the adaptable compressor map for the air compressor.

* * * * *